(12) United States Patent
Yanamoto (10) Patent No.: US 8,744,080 B2
(45) Date of Patent: Jun. 3, 2014

(54) ENCRYPTED DATA RECORDING APPARATUS

(75) Inventor: Kaoru Yanamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 679 days.

(21) Appl. No.: 11/715,184

(22) Filed: Mar. 7, 2007

(65) Prior Publication Data

US 2007/0217604 A1    Sep. 20, 2007

(30) Foreign Application Priority Data

Mar. 17, 2006   (JP) ................................ 2006-075638

(51) Int. Cl.
*G09C 5/00*   (2006.01)

(52) U.S. Cl.
USPC ............... 380/54; 380/201; 380/255; 726/26

(58) Field of Classification Search
USPC ............... 380/54, 201, 255; 726/26
See application file for complete search history.

(56) References Cited

U.S. PATENT DOCUMENTS

| | | | | |
|---|---|---|---|---|
| 6,907,126 | B2 * | 6/2005 | Inada | 380/255 |
| 2002/0150389 | A1 * | 10/2002 | Komoda | 386/94 |
| 2003/0051151 | A1 * | 3/2003 | Asano et al. | 713/193 |
| 2006/0053308 | A1 * | 3/2006 | Zimmerman | 713/193 |
| 2006/0195908 | A1 * | 8/2006 | Oishi et al. | 726/26 |
| 2006/0282898 | A1 * | 12/2006 | Yamamoto et al. | 726/26 |
| 2007/0180270 | A1 * | 8/2007 | Kumagai et al. | 713/193 |
| 2008/0022061 | A1 | 1/2008 | Ito et al. | |

FOREIGN PATENT DOCUMENTS

| | | | |
|---|---|---|---|
| JP | 2003-281071 | 3/2003 | |
| JP | 2002077974 | * 3/2003 | ............. G06F 13/12 |
| JP | 2004-021478 | 1/2004 | |
| JP | 2004-090838 | 3/2004 | |
| JP | 2004-194295 | 7/2004 | |
| JP | 2004-260522 | 9/2004 | |
| JP | 31105729 | 5/2005 | |
| JP | 2005-190350 | 7/2005 | |
| JP | 2006-005726 | 1/2006 | |
| JP | 2006-252451 | 9/2006 | |
| JP | 2007-219693 | 8/2007 | |
| WO | WO 2006-006233 | 1/2006 | |

OTHER PUBLICATIONS

L Jean Camp, DRM: Doesn't Really Mean Digital Copyright Management, Nov. 2002, ACM, 9th ACM conference on computer and communications security.*

* cited by examiner

*Primary Examiner* — Jeffrey Pwu
*Assistant Examiner* — Samuel Ambaye
(74) *Attorney, Agent, or Firm* — Robert J. Depke; The Chicago Technology Law Group, LLC

(57) ABSTRACT

An encrypted data recording apparatus is disclosed. The encrypted data recording apparatus includes: analyzing means for analyzing encrypted data inputted; decrypting means for decrypting the encrypted data analyzed by the analyzing means; encrypting means for encrypting the data decrypted by the decrypting means using key information peculiar to the encrypted data recording apparatus; and recording control means for recording the data encrypted by the encrypting means in plural recording means with redundancy given to the data.

6 Claims, 10 Drawing Sheets

| | msb | | | | | | lsb |
|---|---|---|---|---|---|---|---|
| HEADER [0] | RESERVED (ZERO) | | | | C_A | | E-EMI |
| HEADER [1] | EXCHANGE_KEY_LABEL | | | | | | |
| HEADER [2] | Nc | | | | | | |
| HEADER [3] | | | | | | | |
| HEADER [4] | | | | | | | |
| HEADER [5] | | | | | | | |
| HEADER [6] | | | | | | | |
| HEADER [7] | | | | | | | |
| HEADER [8] | | | | | | | |
| HEADER [9] | | | | | | | |
| HEADER [10] | CL (BYTE LENGTH OF CONTENT) | | | | | | |
| HEADER [11] | | | | | | | |
| HEADER [12] | | | | | | | |
| HEADER [13] | | | | | | | |

ENCRYPTED DATA RECORDING APPARATUS

CROSS-REFERENCES TO RELATED APPLICATIONS

The present invention contains subject matter related to Japanese Patent Application JP 2006-075638 filed in the Japanese Patent Office on Mar. 17, 2006, the entire contents of which being incorporated herein by reference.

BACKGROUND OF THE INVENTION

1. Field of the Invention

The present invention relates to an encrypted data recording apparatus, and, more particularly to an encrypted data recording apparatus such as a network attached storage for recording encrypted content data for copyright protection and the like.

2. Description of the Related Art

In recent years, a digital AV system and the like that record digital contents such as digitized videos and sound in recording (storage) devices such as a hard disk device and reproduce the digital contents are becoming increasingly popular.

A network attached storage (NAS) is widely spread as a storage that can be easily connected from a personal computer connected to a network according to a method based on a so-called Ethernet (registered trademark) conforming to IEEE (Institute of Electrical and Electronics Engineers) 802.3 or a wireless standard conforming to IEEE 802.11.

Figure 10:
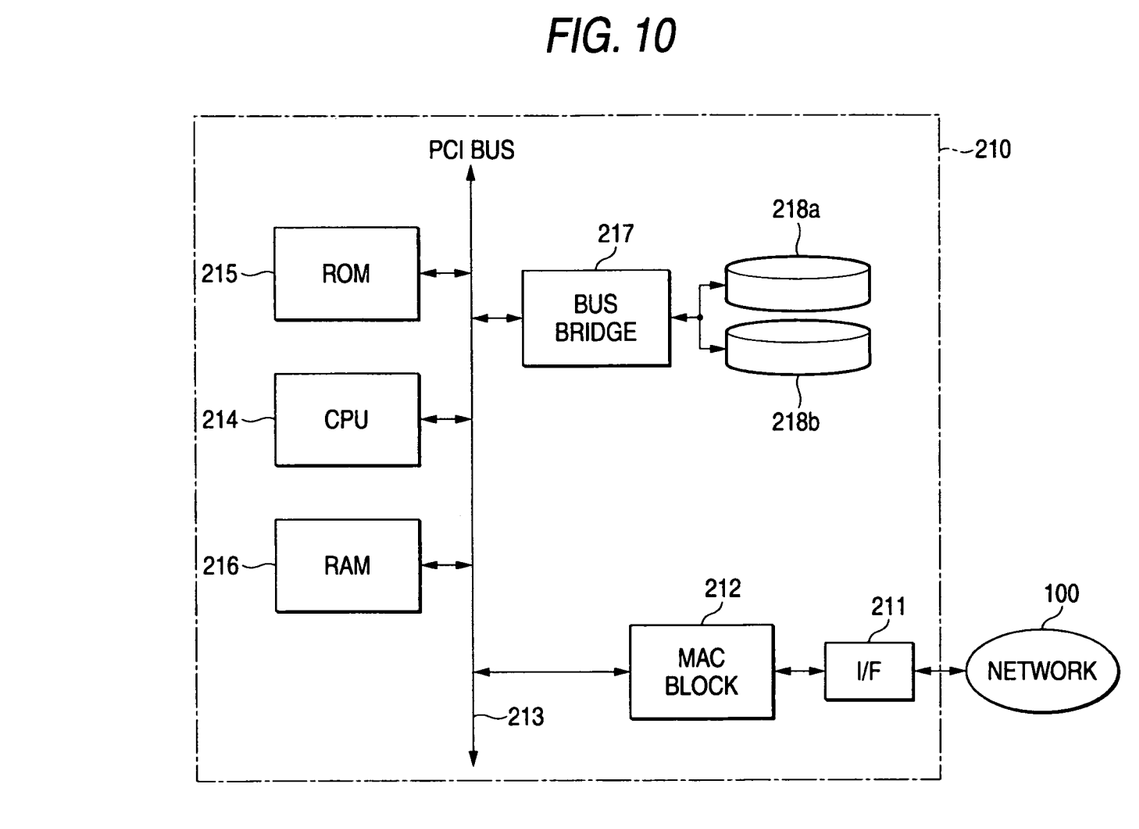
FIG. 10 is a diagram showing a normal network attached storage for storing and saving general data.

For example, a recording apparatus of a mirroring type for backup of data may be used in a server on a network. FIG. 10 is a diagram showing a structure of a general mirroring-type network attached storage. In this mirroring-type network attached storage, a data recording apparatus 210, which is a network attached storage, is connected to a network 100 based on the Ethernet (registered trademark), a wireless LAN standard conforming to IEEE 802.11, or the like. The data recording apparatus 210 is connected to the network 100 via a network interface 211 and an MAC (Media Access Control) block 212. The MAC block 212 is connected to, for example, a PCI (Peripheral Component Interconnect) bus 213, which is an internal bus of the data recording apparatus 210. A CPU 214 serving as control means, a ROM 215 in which programs and the like are stored, and a RAM 216 serving as data storing means are connected to the PCI bus 213. Two recording means (data storages) 218a and 218b such as hard disks are connected to the PCI bus 213 via a bus bridge 217. For example, an EPROM (Erasable and Programmable Read Only Memory) is used as the ROM 215. For example, an SDRAM (Synchronous Dynamic Random Access Memory) is used as the RAM 216.

The data recording apparatus 210 performs writing and the like of files to record the same contents in the recording means 218a and 218b. In other words, in writing a file in the recording means 218a, the data recording apparatus 210 writes the file in the recording means 218b as well. In deleting a file, the data recording apparatus 210 deletes both the file in the recording means 218a and the file in the recording means 281b simultaneously (sequentially in terms of time). The data recording apparatus 210 may read out a file from any one of the hard disks.

In the case of such a mirroring-type network attached storage, there is an advantage that it is possible to normally continue an operation even if one of the hard disks is out of order. In other words, it can be said that one of the recording means functions as a backup. Therefore, if one of the recording means is out of order, it is possible to normally continue a mirroring operation by replacing the recording medium.

In the past, among apparatuses that communicate according to the Internet Protocol (IP), it was difficult to transmit and receive contents such as copyrighted video data. However, in 2004, an official standard was issued as a part of the DTCP (Digital Transmission Contents Protection) standard and license of such contents was started. This makes it possible to circulate copyrighted data using the DTCP/IP, for example, on the Ethernet (registered trademark). It is also possible to store copyrighted data such as contents permitted to be recorded and stored like so-called Copy Once (may be copied only once) (see, for example, JP-A-2004-194295).

As states of the copyrighted contents, there are about three states. Specifically, the states are "Copy Never", i.e., a state in which it is not permitted to copy contents, "Copy Once", i.e., a state in which it is permitted to copy contents only once, and "Copy No More", i.e., a state in which it is not permitted to record contents of "Copy Once" and further copy the contents.

For example, in a DVD (Digital Versatile Disk) recorder and the like, "Copy Once" contents are usually stored in a hard disk under the present situation. However, it is difficult for a general user to keep a backup because of the characteristic that copying is not permitted. On the other hand, in a usual agreement with a copyright holder, it is permitted to back up contents. However, it is prohibited to allow another apparatus to reproduce the contents backed up. In other words, it is prohibited to multiply copies of the contents.

SUMMARY OF THE INVENTION

However, in storing the copyrighted data, a problem occurs when a so-called mirroring-type network attached storage that makes it possible to back up data is used.

For example, usually, in a mirroring-type storage, when one of the recording means 218a and 218b, for example, the recording means 218a, of the data recording apparatus 210 shown in FIG. 10 is moved to and mounted on another apparatus, the recording means operates normally. However, when one of recording means in which copyrighted data is recorded is mounted on another apparatus, it is possible to read out the copyrighted data in the another apparatus. In other words, it is possible to copy the copyrighted data.

Therefore, this is against the rule described in the License Agreement of the DTCP that provides that copyrighted data may be backed up but only a single use copy is permitted, i.e., it is possible to use a copy only once.

Therefore, it is desirable to provide an encrypted data recording apparatus that can back up encrypted data such as copyrighted contents without violating rules.

According to an embodiment of the invention, there is provided an encrypted data recording apparatus including analyzing means for analyzing encrypted data inputted, decrypting means for decrypting the encrypted data analyzed by the analyzing means, encrypting means for encrypting the data decrypted by the decrypting means using key information peculiar to the encrypted data recording apparatus, and recording control means for recording the data encrypted by the encrypting means in plural recording means with redundancy given to the data.

According to the embodiment of the invention, encrypted data inputted is decrypted, the data is encrypted using key information peculiar to the encrypted data recording apparatus, and the data encrypted is recorded in plural recording means with redundancy given to the data. This makes it possible to back up encrypted data such as copyrighted contents without violating rules.

DESCRIPTION OF THE PREFERRED EMBODIMENTS

A specific embodiment of the invention will be hereinafter explained in detail with reference to the accompanying drawings. An encrypted data recording apparatus, which is a network attached storage, is described as a specific example of the invention. As a part of the DTCP/IP (Digital Transmission Contents Protection/Internet Protocol), the encrypted data recording apparatus stores a copy of copyrighted digital content data encrypted by a so-called AES (Advanced Encryption Standard) in another location on a real time basis according to mirroring defined as RAID-1 (Redundant Arrays of Inexpensive Disks 1).

Figure 1:
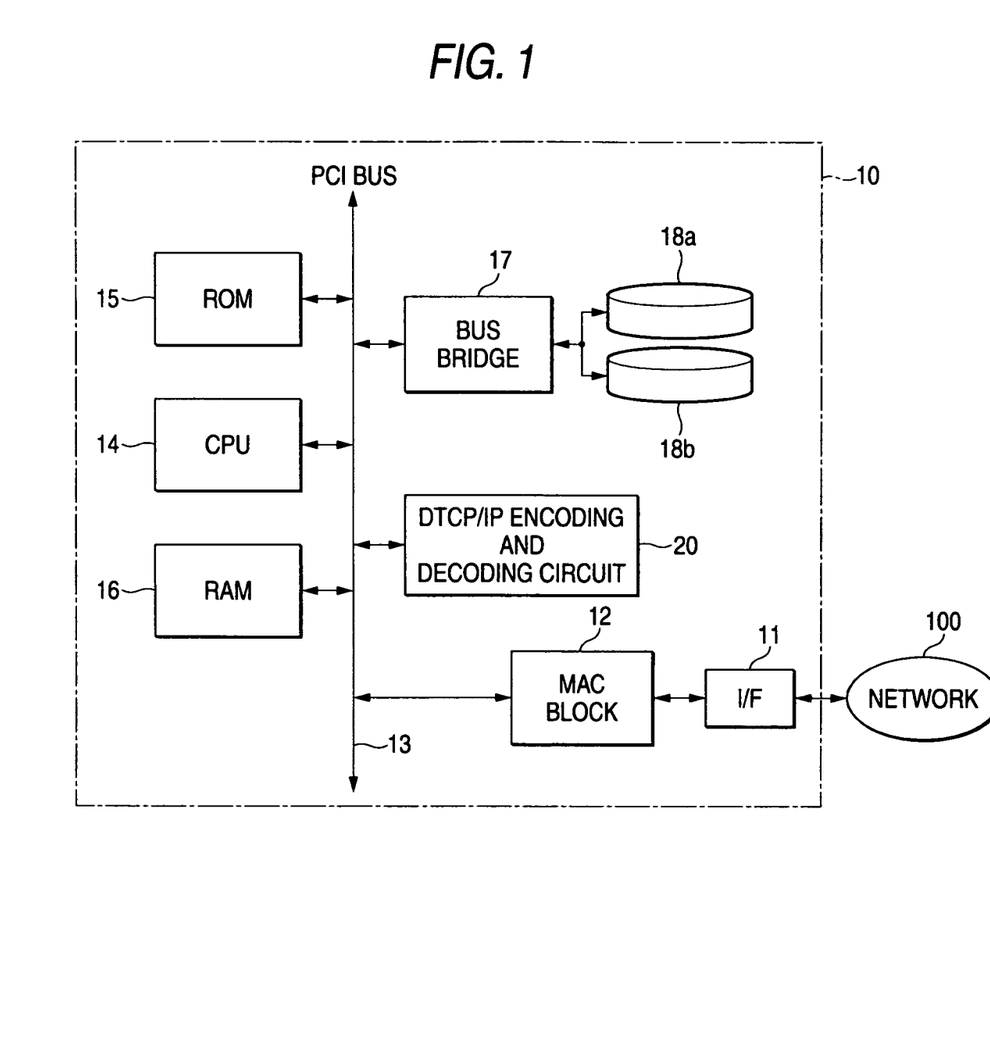
FIG. 1 is a block diagram showing a schematic structure of an encrypted data recording apparatus according to an embodiment of the invention.

FIG. 1 is a block diagram schematically showing a structure of an encrypted data storing apparatus 10 according to an embodiment of the invention.

A network 100 in FIG. 1 is, for example, a network based on the Ethernet (registered trademark) conforming to IEEE (Institute of Electrical and Electronics Engineers) 802.3, a wireless standard (a wireless LAN standard) conforming to IEEE 802.11, or the like. The encrypted data recording apparatus 10 is connected to the network 100 such as the Ethernet (registered trademark) via a network interface 11 and an MAC (Media Access Control) block 12. The MAC block 12 is connected to, for example, a PCI (Peripheral Component Interconnect) bus 13, which is an internal bus of the encrypted data recording apparatus 10.

A CPU 14 serving as control means, a ROM 15 in which local key information peculiar to the apparatus, programs, and the like are stored, and a RAM 16 serving as data storing means are connected to the PCI bus 13. Two recording means (data storages) 18a and 18b such as hard disks, in which data is recorded by mirroring, are connected to the PCI bus 13 via a bus bridge 17. For example, an EPROM (Erasable and Programmable Read Only Memory) is used as the ROM 15. For example, an SDRAM (Synchronous Dynamic Random Access Memory) is used as the RAM 16. Moreover, a DTCP/IP (Digital Transmission Contents Protection/Internet Protocol) encrypting and decrypting circuit 20 is connected to the PCI bus 13. As a part of the DTCP/IP standard, encryption by a so-called AES (Advanced Encryption Standard) is applied to copyrighted digital content data communicated via such a network 100. The AES means cryptography of a common key (secret key) encryption system adopted by the NIST (National Institute of Standards and Technology) in the United States as an international standard cryptography of the next generation.

In the encrypted data recording apparatus 10 in FIG. 1, encrypted content data from the network 100 is temporarily written in the RAM 16 on the CPU 14 side, a header of a data packet is analyzed, and the content data is sent from the RAM 16 on the CPU 14 side to the DTCP/IP encrypting and decrypting circuit 20. In the DTCP/IP encrypting and decrypting circuit 20, after DTCP/IP encryption (AES encryption) of the encrypted content data is released (decrypted), the encrypted content data is subjected to local encryption for storage, returned to the RAM 16 on the CPU 14 side, and recorded in the two recording means 18a and 18b such as hard disks via the bus bridge 17 according to mirroring. The content data (subjected to the local encryption) recorded in the recording means 18a and 18b is read out via the bus bridge 17 and sent to the DTCP/IP encrypting and decrypting circuit 20. After the local encryption is released (decrypted), the content data subjected to the DTCP/IP encryption is outputted to the network 100 via the MAC block 12 and the interface 11. In this embodiment, AES cryptography that uses key information peculiar to the encrypted data recording apparatus 10 is used for the local encryption for storage. In the explanation of this embodiment, the key information is stored in the ROM 15. However, a storage medium only has to have tamper resistance to make it difficult to analyze the key information and is not limited to the ROM 15.

Figure 2:
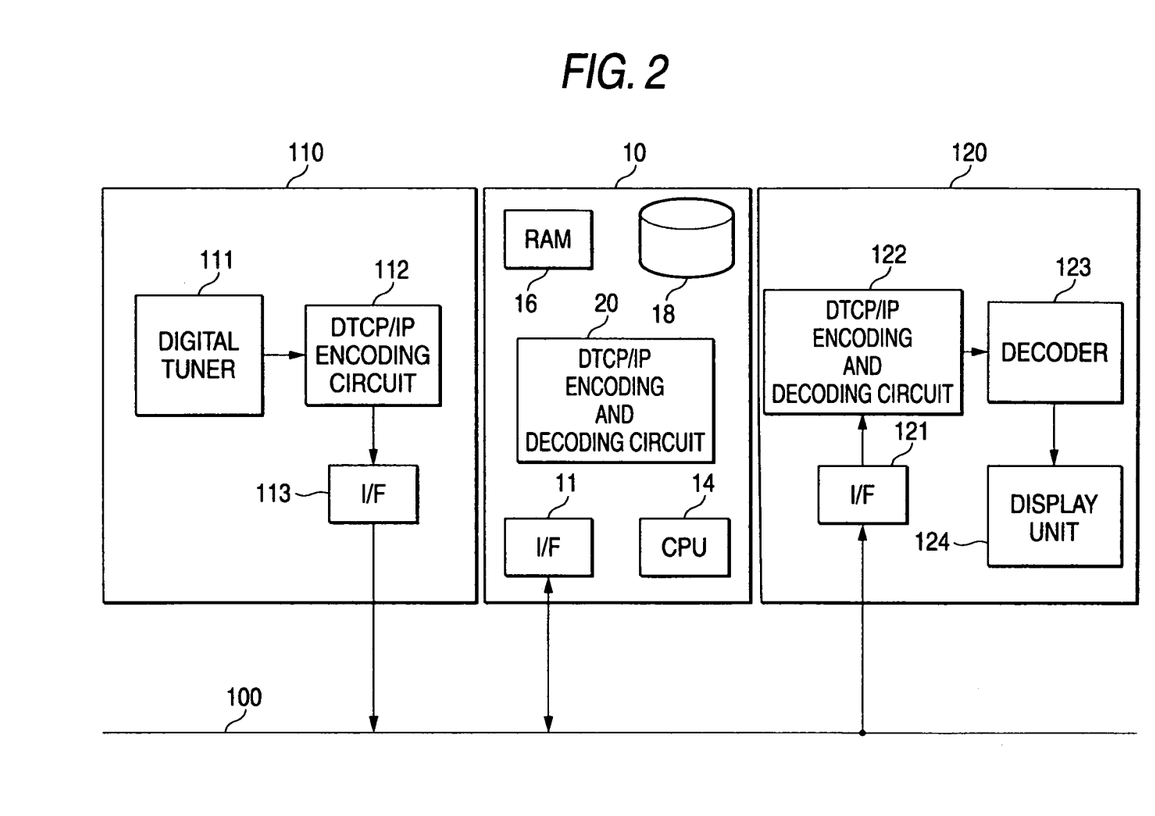
FIG. 2 is a block diagram showing a specific example of a home network including the encrypted data recording apparatus according to the embodiment.

Such an encrypted data recording apparatus 10 of a network attached type is used in a form of, for example, a home network shown in FIG. 2. For example, a reception terminal apparatus 110 such as a BS tuner or a CS tuner and a display device 120 such as a television receiver of a network attached type are connected to the home network serving as the network 100 such as the Ethernet (registered trademark) or a wireless LAN to which the encrypted data recording apparatus 10 is connected.

In FIG. 2, the reception terminal apparatus 110 is also referred to as a set-top box (STB) or an IRD (Integrated Receiver Decoder). The reception terminal apparatus 110 sends digital content data such as a broadcast program from the digital tuner 111, which receives digital broadcasts such as a BS (Broadcasting Satellite) broadcast, a CS (Communication Satellite) broadcast, and a terrestrial digital broadcast, to a DTCP/IP encrypting circuit 112. The reception terminal apparatus 110 applies the AES encryption to the digital content data and sends the digital content data to the network 100 via the interface 113. The content data encrypted is sent to the encrypted data recording apparatus 10. The DTCP/IP encryption is released (decrypted) by the DTCP/IP encrypting and decrypting circuit 20 as described above. The content data is subjected to the local encryption for storage and same contents are recorded in the recording means 18a and 18b. In this embodiment, as described above, AES cryptography that uses key information peculiar to the encrypted data recording apparatus 10 is used for the local encryption as described above. In reading out the content data recorded in the recording means 18a and 18b, the local encryption is released by the DTCP/IP encrypting and decrypting circuit 20 using the key information peculiar to the encrypted data recording apparatus 10. The content data is subjected to the DTCP/IP encryption again and sent to the network 100. In this case, decryption and encryption by the DTCP/IP encrypting and decrypting circuit 20 are performed by applying DMA (Direct Memory Access) processing to the RAM 16. An operation for this processing will be described later. The display device 120 is inputted with the encrypted content data sent via the network 100 via interface 121 and releases the DTCP/IP encryption in a DTCP/IP decrypting circuit 122. The display device 120 sends the content data to a decoder 123 and decodes encoding of the content data encoded in an encoding system such as the MPEG (Moving Picture Experts Group) system. The display device 120 sends the content data to display means 124, in which a PDP (Plasma Display Panel), an LCD (Liquid Crystal Display), a CRT (Cathode Ray Tube), or the like is used, and performs video display.

The system shown in FIG. 2 communicates data of videos and music among various home electronics, computers, and the like provided in a home and connected to a network. The system is capable of communicating copyrighted video data by applying the AES encryption as a part of the DTCP standard.

Figure 3:
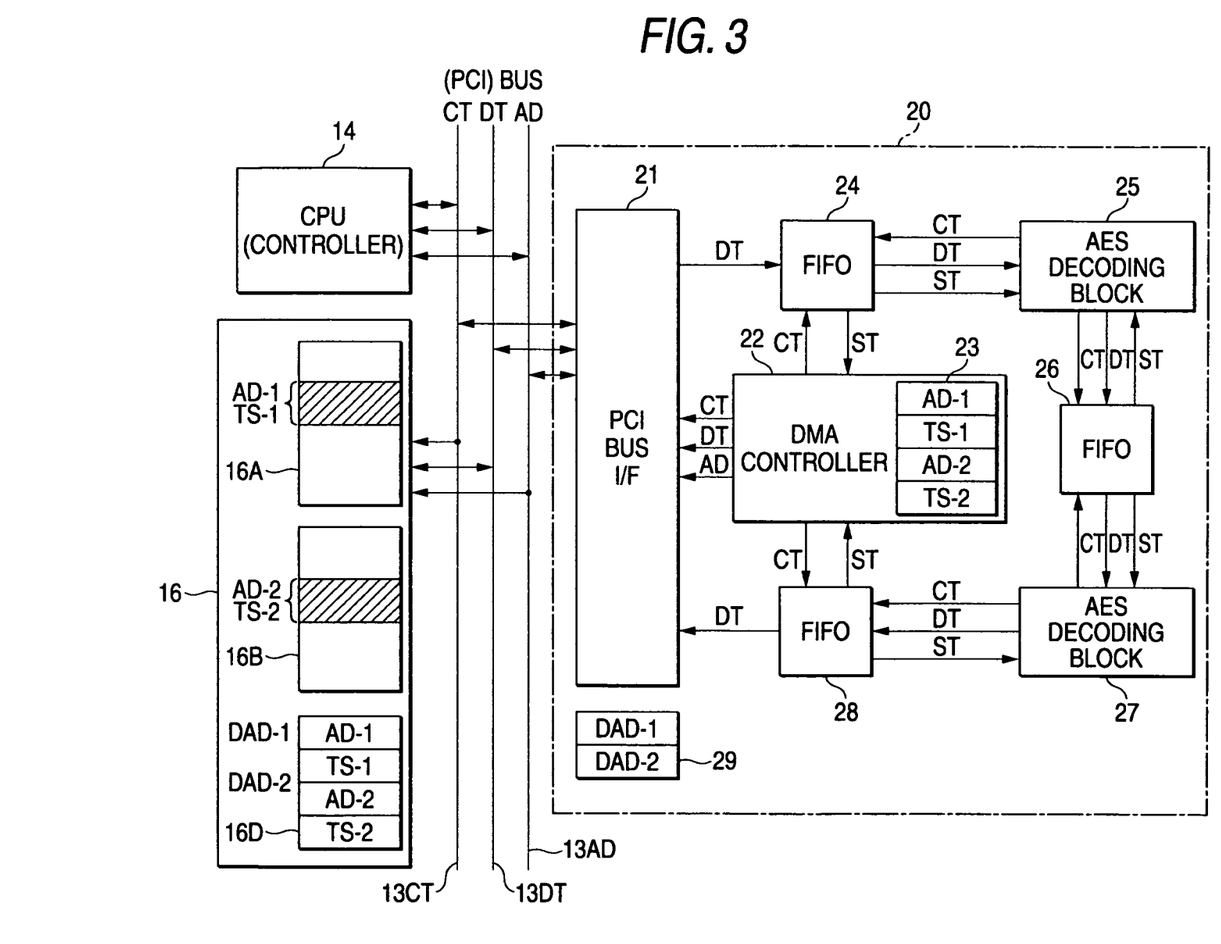
FIG. 3 is a block diagram showing an example of a structure of a DTCP/IP encrypting and decrypting circuit used in the encrypted data recording apparatus according to the embodiment.

FIG. 3 is a block circuit diagram for explaining a specific example of the DTCP/IP encrypting and decrypting circuit 20 in the encrypted data recording apparatus 10. In FIG. 3, the CPU (controller) 14, the RAM 16, and the DTCP/IP encrypting and decrypting circuit 20 are connected to a control bus 13CT, a data bus 13DT, and an address bus 13AD serving as PCI buses, which is an internal bus of the encrypted data recording apparatus. In the RAM 16, at least a memory area 16A for DTCP/IP-encrypted content data and a memory area 16B for locally-encrypted content data for storage are provided. The DTCP/IP encrypting and decrypting circuit 20 captures content data in the memory area 16A for DTCP/IP-encrypted content data into the DTCP/IP encrypting and decrypting circuit 20 using a DMA (Direct Memory Access) function of a simultaneous bidirectional type. The DTCP/IP encrypting and decrypting circuit 20 releases (decrypts) the DTCP/IP encryption, applies the local encryption for storage to the content data using the key information peculiar to the encrypted data recording apparatus 10, and transfers the content data to the memory area 16B for locally-encrypted content data. The DTCP/IP encrypting and decrypting circuit 20 records same contents of locally-encrypted content data, which is stored in the memory area 16B, in the two recording means (data storages) 18a and 18b such as hard disks, respectively, via the bus bridge 17 in FIG. 1.

The general DMA function is a function of a DMA controller for performing data movement (data transfer) from a specific address on a memory space incidental to a bus to a specific address on a memory space incidental to the same bus without the intervention of a CPU. On the other hand, in this embodiment, the fact that, when DMA operation is performed twice to realize release of the DTCP/IP encryption and processing for the local encryption for storage, inconvenience is caused because a memory having a large size has to be mounted on the DTCP/IP encrypting and decrypting circuit side is taken into account. As shown in FIG. 3, the memory area 16A, which is a memory area before the decryption of the DTCP/IP encryption, and the memory area 16B, which is a memory area after the decryption, are secured in the RAM 16 on the CPU 14 side. A DMA controller 22 of the DTCP/IP encrypting and decrypting circuit 20 is started to extract data present in the memory area 16A on the CPU side and decrypts the data, perform encryption using the key information peculiar to the encrypted data recording apparatus 10, and transfer the data to the memory area 16B on the CPU side.

A specific example of an internal structure and operations of the DTCP/IP encrypting and decrypting circuit 20 in FIG. 3 will be explained.

In FIG. 3, a PCI bus interface 21 in the DTCP/IP encrypting and decrypting circuit 20 is connected to the control bus 13CT, the data bus 13DT, and the address bus 13AD serving as the PCI buses, which are the internal buses of the encrypted data recording apparatus. The DMA controller 22 is connected to the PCI bus interface 21. A DMA register block 23 is provided in the DMA controller 22. Among signal lines for connecting the respective units in the DTCP/IP encrypting and decrypting circuit 20 in FIG. 3, CT indicates a control line, DT indicates a data line, AD indicates an address line, and ST indicates a status line. The control line CT, the data line DT, and the address line AD are connected between the PCI bus interface 21 and the DMA controller 22. DTCP/IP-encrypted (AES-encrypted) data from the first memory area 16A of the RAM 16, which is an external memory, is temporarily stored in an FIFO (First In First Out) memory 24 via the data bus 13DT and the PCI bus interface 21. The DTCP/IP-encrypted data is sent to an AES decrypting block 25 and the AES encryption is released (decrypted). The DTCP/IP-encrypted data is sent to an AES encrypting block 27 via an FIFO memory 26, subjected to local encryption for storage described later, and temporarily stored in an FIFO memory 28. The DTCP/IP-encrypted data is sent to the second memory area 16B via the PCI bus interface 21 and the data bus 13DT serving as the PCI bus and stored in the second memory area 16B. In the DTCP/IP encrypting and decrypting circuit 20, a control signal is sent from the DMA controller 22 to the respective FIFO memories 24 and 28 and status information is sent from the respective FIFO memories 24 and 28 to the DMA controller 22. A control signal is sent from the AES decrypting block 25 to the respective FIFO memories 24 and 26 and status information is sent from the respective FIFO memories 24 and 26 to the AES decrypting block 25. A control signal is sent from the AES encrypting block 27 to the respective FIFO memories 26 and 28 and status information is sent from the respective FIFO memories 26 and 28 to the AES encrypting block 27.

A data transfer operation by the DMA controller 22 in such a DTCP/IP encrypting and decrypting circuit 20 will be explained more in detail.

In DMA processing, the DMA controller 22 reads descriptors such as a data transfer address and a transfer size, which are attribute information concerning data transfer, from a descriptor storing area 16D of an external memory (e.g., the RAM 16 in FIG. 1) to the DMA register block 23 in the DMA controller 22 and controls data transfer between the memory areas 16A and 16B. Addresses (descriptor storing memory addresses DAD-1, DAD-2, etc.) of the descriptor storing area 16D of the RAM 16, which is the external memory, are written in a descriptor-storing-memory-address register 29 in the DTCP/IP encrypting and decrypting circuit 20. When the DMA is started, the DMA controller 22 accesses the addresses (the addresses DAD-1, DAD-2, etc. of the descriptor storing area 16D of the RAM 16) stored in the descriptor-storing-memory-address register 29 to read the descriptors such as the data transfer address and the transfer size in registers in the DMA register blocks 23 and 29. In the example in FIG. 3, the DMA controller 22 reads a starting address AD-1 and a transfer data size TS-1 of a transfer source and a starting address AD-2 and a transfer data size TS-2 of a transfer destination in a register in the DMA register block 23.

When a memory section of a transfer source and a memory section of a transfer destination are divided into plural sections, as descriptors corresponding to the plural memory sections, a so-called scatter gather table (SGT) including not only starting addresses and transfer data sizes of the respective memory sections but also an address of the next descriptor may be used. In this case, a starting descriptor-storing-memory address only has to be stored in the descriptor-storing-memory-address register 29 in the DTCP/IP encrypting and decrypting circuit 20.

When the DMA is started, the DMA controller 22 reads out the data (the memory addresses and the transfer data sizes) written in the DMA register block 23, reads out data for the transfer data size TS-1 from the transfer source address AD-1 of the memory area 16A, and sends the data to the FIFO memory 24 via the PCI bus interface 21. A state (a data accumulation state, etc.) of the FIFO memory 24 is sent to the DMA controller 22 and the AES decrypting block 25 as status information. Control signals are sent from the DMA controller 22 and the AES decrypting block 25 to the FIFO memory 24. Consequently, data transfer from the memory area 16A to the FIFO memory 24 and data transfer from the FIFO memory 24 to the AES decrypting block 25 are controlled. For example, data requested according to progress of a decryption processing operation by the AES decrypting block 25 is transferred from the FIFO memory 24 to the AES decrypting block 25. When the FIFO memory 24 is in a full state, control for, for example, stopping data transfer from the memory area 16A to the FIFO memory 24 is performed.

In the AES decrypting block 25, data AES-encrypted in accordance with the DTCP/IP standard is subjected to AES decryption processing and sent to the AES encrypting block 27 via the FIFO memory 26. The decryption processing for the AES encrypted data according to the DTCP/IP standard in the AES decrypting block 25 is performed using an encryption key generated on the basis of a random number (a seed) for content key generation arranged in a predetermined position of a DTCP header described later.

A state (a data accumulation state, etc.) of the FIFO memory 26 is sent to the AES decrypting block 25 and the AES encrypting block 27 as status information and control signals are sent from the AES decrypting block 25 and the AES encrypting block 27 to the FIFO memory 26. Consequently, data transfer from the AES decrypting block 25 to the FIFO memory 24 and data transfer from the FIFO memory 24 to the AES encrypting block 27 are controlled.

The AES encrypting block 27 performs encryption for recording content data in the two recording means (the data storages) 18a and 18b such as hard disks in FIG. 1. The AES cryptography that uses the key information peculiar to the encrypted data recording apparatus 10 is used for this encryption. This takes into account the fact that it is necessary to apply the AES encryption conforming to the DTCP/IP standard when content data recorded in the recording means 18a and 18b in FIG. 1 are read out, subjected to decryption and encryption by the DTCP/IP encrypting and decrypting circuit 20, and outputted to the network 100 such as the Ethernet (registered trademark). The key information peculiar to the apparatus is, for example, recorded in the ROM 15 in advance when the apparatus is manufactured.

The data encrypted by the AES encrypting block 27 is sent to the memory area 16B via the FIFO memory 28 and the PCI bus interface 21 and written in an area for the transfer data size TS-2 from the address AD-2 of the transmission destination. The encrypted content data written in the memory area 16B is sent to the two recording means (the data storages) 18a and 18b such as hard disks via the bus bridge 17 in FIG. 1 and subjected to mirroring.

As a specific method for realizing the DTCP/IP encrypting and decrypting circuit 20 in FIG. 3, DMAs of two channels are switched in time division and caused to operate, data transfer from the memory area 16A on a sender side to the FIFO memory 24 is performed on one channel, and data transfer from the FIFO memory 28 to the memory area 16B on a receiver side is performed on the other channel. As the AES decrypting block 25 and the AES encrypting block 27, one AES encrypting and decrypting block may be used in time division.

The operations of the DTCP/IP encrypting and decrypting circuit 20 are operations for decrypting DTCP/IP-encrypted content data from the network 100 in FIG. 1 and applying the local encryption to the content data in the DTCP/IP encrypting and decrypting circuit 20 and recording the content data in the recording means 18a and 18b such as hard disks. Operations for decrypting locally-encrypted content data recorded in the recording means 18a and 18b such as hard disks and applying the DTCP/IP encryption to the content data in the DTCP/IP encrypting and decrypting circuit 20 and outputting the content data to the network 100 will be explained below.

In this case, the locally-encrypted content data recorded in the recording means 18a and 18b such as hard disks is written in the memory area 16A of the RAM 16, which is the external memory. This data is readout and the local encryption is decrypted in the DTCP/IP encrypting and decrypting circuit 20 using the key information peculiar to the apparatus. The data subjected to the DTCP/IP encryption is transferred to and written in the memory area 16B of the RAM 16.

In other words, locally-encrypted (AES-encrypted) data from the memory area 16A of the RAM 16 is temporarily stored in the FIFO memory 24 via the data bus 13DT and the PCI bus interface 21. The data is sent to the AES decrypting block 25 and the AES encryption is released (decrypted). The data is sent to the AES encrypting block 27 via the FIFO memory 26, subjected to the DTCP/IP encryption, and temporarily stored in the FIFO memory 28. The data is sent to the memory area 16B via the PCI bus interface 21 and the data bus 13DT serving as the PCI bus and stored therein.

The DTCP/IP-encrypted data stored in the memory area 16B of the RAM 16 is sent to the MAC block 12 via the PCI bus 13 in FIG. 1 and delivered to the network 100 based on the Ethernet (registered trademark) conforming to IEEE 802.3 or the wireless standard (the wireless LAN standard) conforming to IEEE 802.11 via the network interface 11.

A structure of a data packet transmitted via the network 100 in FIG. 1 will be explained with reference to FIGS. 4 to 9.

Figure 4A:
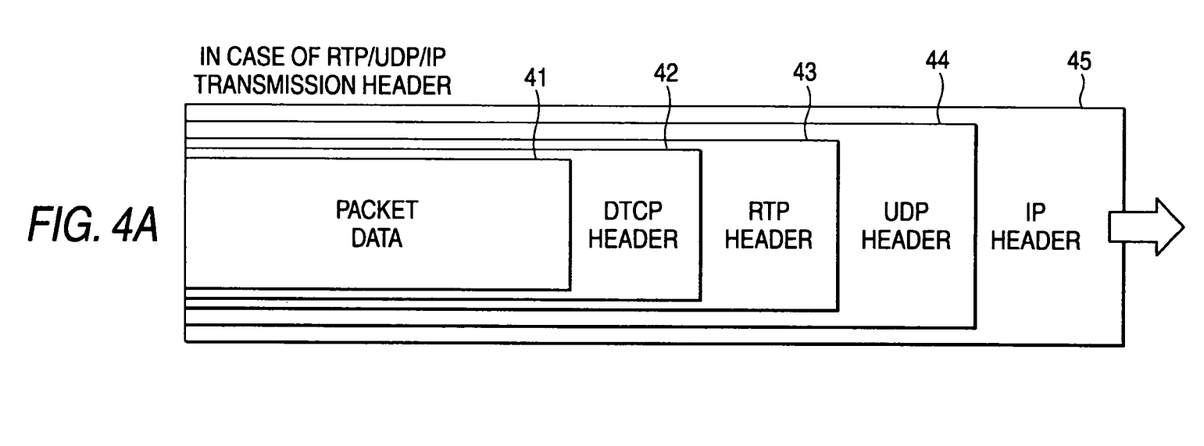
FIG. 4A is a diagram for explaining a structure of a packet in the case of RTP/UDP/IP transmission.
Figure 4B:
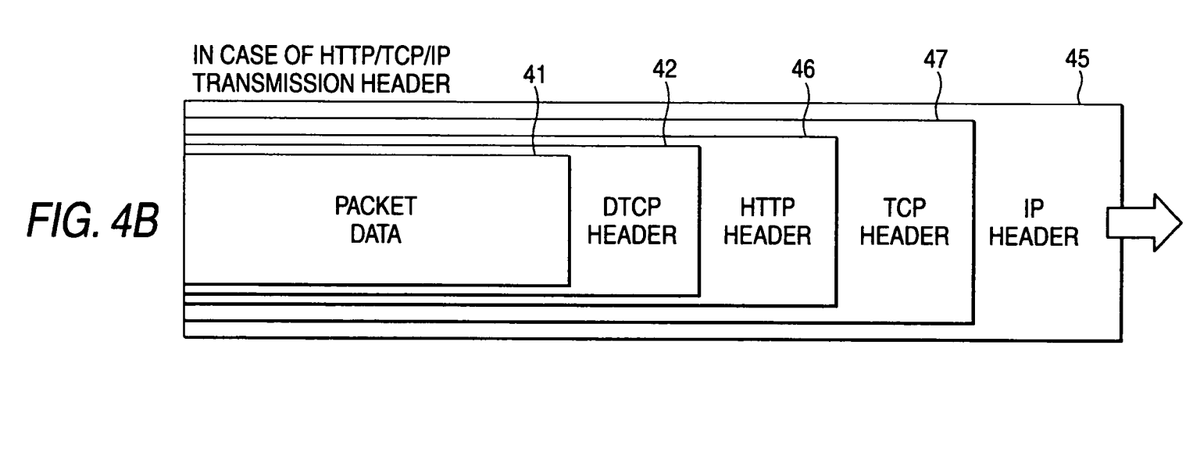
FIG. 4B is a diagram for explaining a structure of a packet in the case of HTTP/TCP/IP transmission.

FIG. 4A shows a structure of a packet in the case of RTP/UDP/IP transmission. FIG. 4B shows a structure of a packet in the case of HTTP/TCP/IP transmission. First, in FIG. 4A, a DTCP header 42 conforming to the DTCP/IP standard is added to packet data 41 of, for example, an AV (Audio Visual) stream such as an MPEG transport stream. For the RTP/UDP/IP transmission, an RTP header 43, a UDP header 44, and an IP header 45 are sequentially added to the packet data 41 to form an IP packet (an IP datagram) and the IP packet is transmitted via the network 100. In an example in FIG. 4B, instead of the RTP header 43 and the UDP header 44 in FIG. 4A, an HTTP header 46 and a TCP header 47 for the HTTP/TCP/IP transmission are added to the packet data 41 and the IP header 45 is further added to the packet data 41 as shown in FIG. 4A to form an IP packet.

Figure 5:
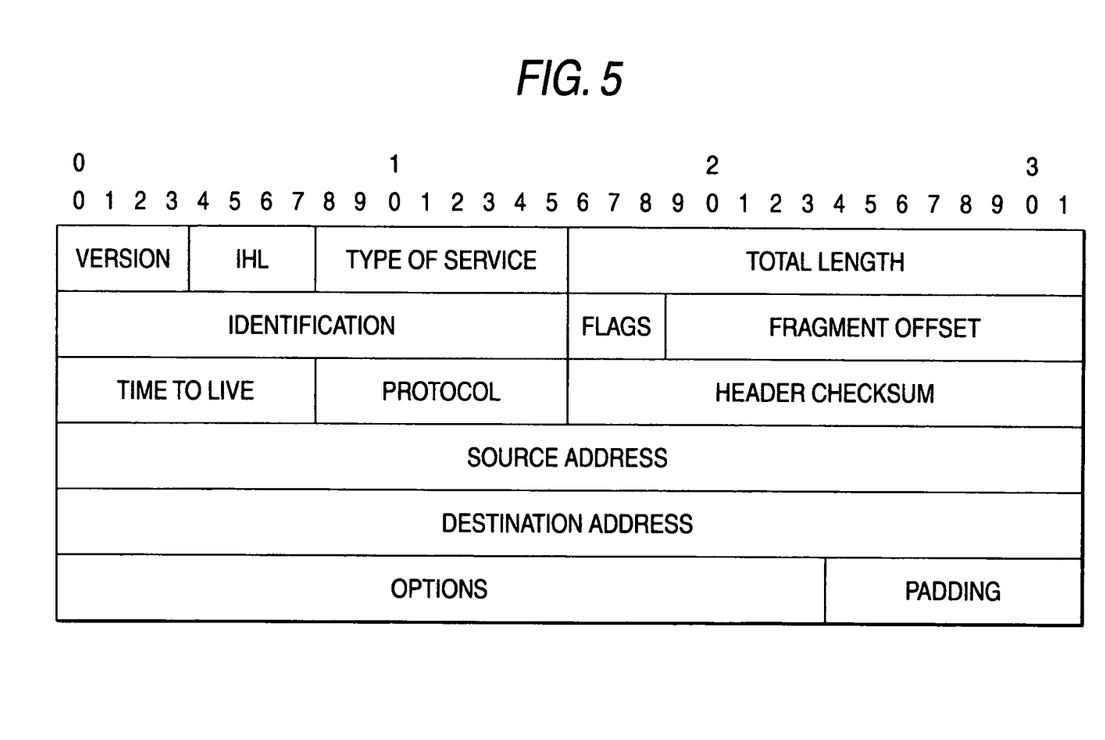
FIG. 5 is a diagram for explaining a structure of an IP header.
Figure 6:
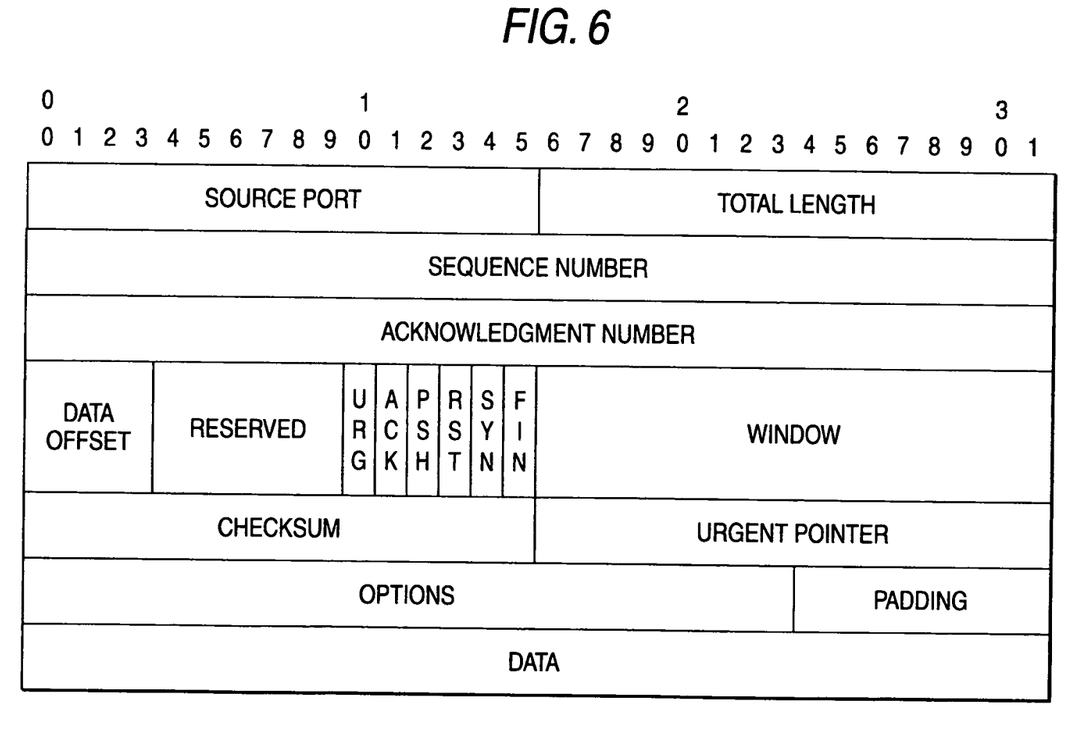
FIG. 6 is a diagram for explaining a structure of a TCP header.
Figure 7:
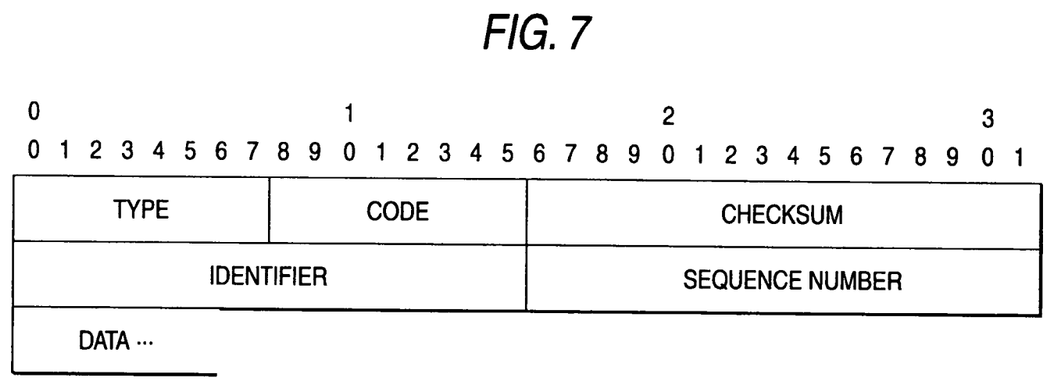
FIG. 7 is a diagram for explaining a ping command, which is a command for inspecting connectivity of a TCP/IP network.
Figure 8:
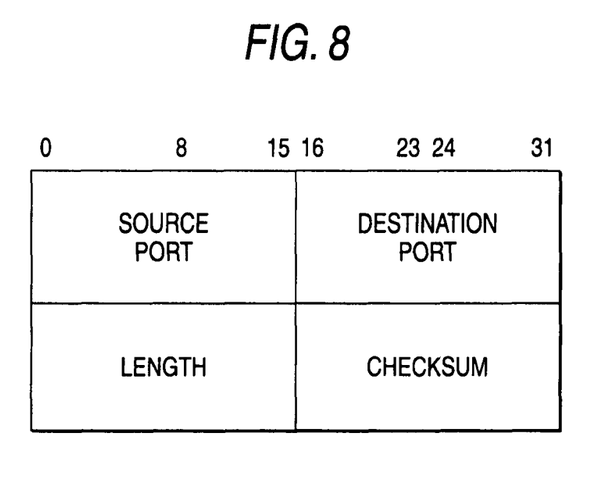
FIG. 8 is a diagram for explaining a structure of a UDP header.

A structure of the IP header 45 in FIGS. 4A and 4B is shown in FIG. 5. A structure of the TCP header 47 is shown in FIG. 6. "Source Port" and "Destination Port" in FIG. 6 indicate a transmission source TCP port number and a reception side TCP port number, respectively. A so-called ping command, which is a command for inspecting connectivity of a TCP/IP network, is inserted in a data section (data) in FIG. 6 and is formed as shown in FIG. 7. An arbitrary numerical value is put in "Identifier" in FIG. 7 on a transmission side to check matching of the transmission side and a reception side. A numerical value is also put in "Sequence Number" in FIG. 7 on the transmission side to check matching of the transmission side and the reception side. In the ping command, appropriate 32-byte data is put in "data". Length of the data is variable. The reception side directly returns the data to the transmission side. FIG. 8 shows a structure of the UDP header in FIG. 4A. "Source Port" and "Destination Port" in FIG. 8 indicate a transmission source TCP port number and a reception side TCP port number, respectively.

Figure 9:
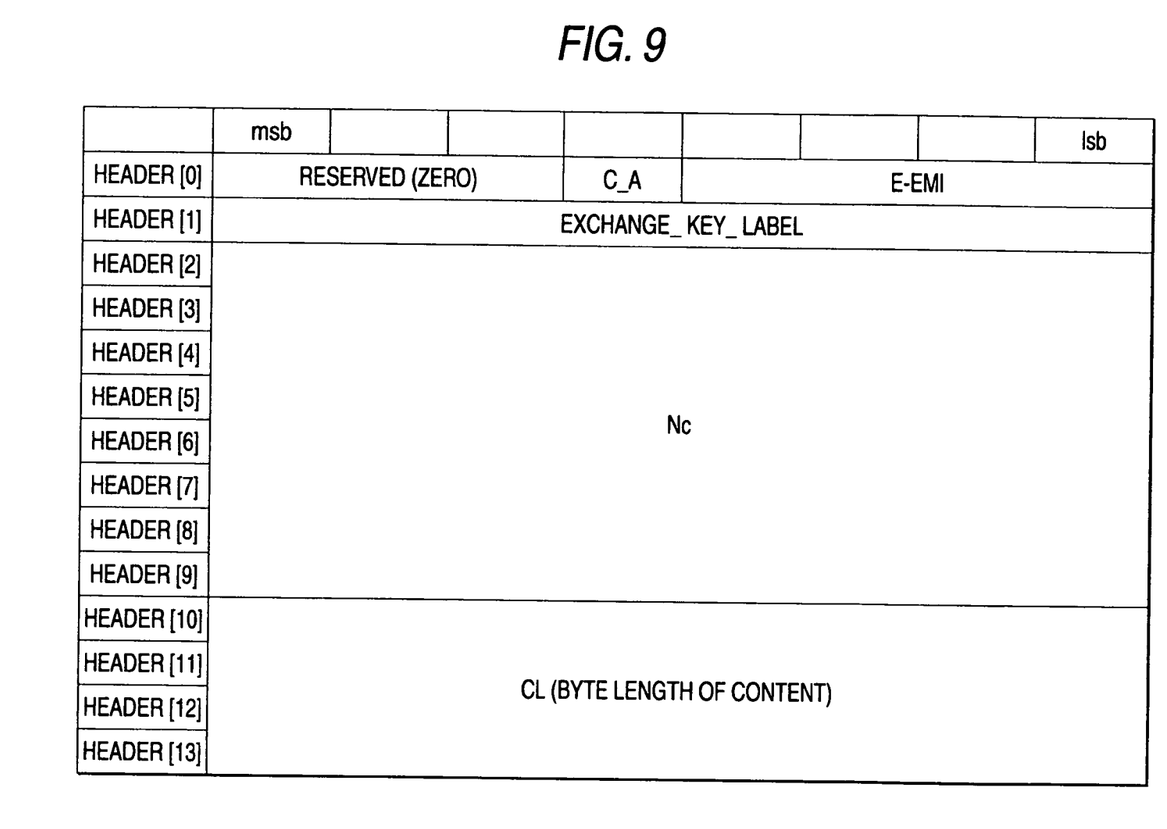
FIG. 9 is a diagram for explaining a structure of a DTCP header.

FIG. 9 shows a structure of the DTCP header 42 in FIGS. 4A and 4B. "C_A" (cipher algorithm) in FIG. 9 indicates an encryption algorithm. When "C_A" is 0, "C_A" indicates an AES cipher. When "C_A" is 1, "C_A" indicates an optional cipher. However, the optional cipher is not defined yet. "E_EMI" indicates a level of contents protection. In copy never, "E_EMI" is "1100" in a binary number, in no-more-copies, "E_EMI" is "0100", and in copy free, "E_EMI" is "0000". "exchange_key_label" is a label defined for each content. When "exchange_key_label" is other than "0000", "exchange_key_label" indicates an encrypted content. "Nc" is a random number used for generation of a content key (a content encryption key). In the case of the DTCP/IP encryption, "Nc" is switched every predetermined time (30 seconds to 2 minutes) or data length (equal to or smaller than 128 Mbytes) to switch the content encryption key. "CL" indicates a byte length of content data. In this embodiment, analysis of these headers is performed by the CPU 14. When contents protection is defined, contents are encrypted using the key information peculiar to the apparatus at the time of the local encryption and mirrored to the two recording means.

According to the embodiment of the invention explained above, by setting an encryption key of a local encryptor to be different for each storage of a mirroring type, even when one of the recording means such as hard disks is moved to another storage of the mirroring type, since an encryption key for a local cipher is different, "Usable Copy" does not increase. In other words, it is possible to backup copyrighted contents more safely by changing a local encryption key for each storage for backup.

It is possible to simplify circuit structures for encryption and decryption by using a DTCP/IP encryptor and a local encryptor in common. It is possible to reduce a necessary memory size by using a simultaneous bidirectional DMA function.

In the DTCP/IP, it is decided as a rule to use the AES for stream encryption and decryption. Thus, when an encrypted stream from a network side is decrypted, an AES encryptor is free because an AES decryptor is used. When data is encrypted and outputted to the network side, the AES decryptor is free because the AES encryptor is used. Therefore, it is possible to simplify structures for encryption and decryption without deteriorating encryption intensity at all by, as shown in FIG. 3, using the AES encrypting block 27 for the local encryption for recording in the recording means 18*a* and 18*b*, which are storages, or using the AES decrypting block 25 for decryption of locally-encrypted stream data from the recording means 18*a* and 18*b*. This means that a common encryption and decryption structure is used for the DTCP/IP encryption and decryption and the local encryption and decryption.

Moreover, taking into account the fact that the encryptor and the decryptor have many components in common, one structure for encryption and decryption may be used as the encryptor or the decryptor in time division.

The DMA (Direct Memory Access) function is usually a function of a DMA controller for performing data movement from a specific address on a memory space incidental to a bus to a specific address on a memory space incidental to the same bus without the intervention of a CPU. On the other hand, in the apparatus according to this embodiment, the fact that, when a DMA operation is performed twice for decryption and encryption, inconvenience is caused because a memory having a large size has to be mounted on the DTCP/IP encrypting and decrypting circuit 20 side is taken into account. In FIG. 3, operation for data transfer from the first memory area 16A of the RAM 16 to the DTCP/IP encrypting and decrypting circuit 20 and operation for data transfer from the DTCP/IP encrypting and decrypting circuit 20 to the second memory area 16B of the RAM 16 are realized by simultaneous bidirectional DMA processing. In other words, the memory area 16A, which is a first memory area before the decryption, and the memory area 16B, which is a second memory area after the decryption, are secured in the RAM 16, which is the external memory. The DMA controller 22 of the DTCP/IP encrypting and decrypting circuit 20 is started to extract data present on the CPU 14 side, perform encryption of the data again, and return the data to the memory space on the CPU side.

Therefore, according to the embodiment, the DTCP/IP encrypting and decrypting circuit 20 performs the simultaneous bidirectional DMA processing for reading encrypted data stored in the memory area 16A of the RAM 16, applying decryption of first encryption and applying second encryption to the data, and writing the data in the memory area 16B of the RAM 16. This makes it possible to reduce processing and reduce a memory size.

It goes without saying that the invention is not limited only to the embodiment and various modifications of the embodiment are possible without departing from the spirit of the invention. For example, the encrypted data recording apparatus 10 according to the embodiment includes the two recording means for mirroring and recording data. However, the structure of the encrypted data recording apparatus 10 is not limited to this. The encrypted data recording apparatus 10 may include three or more recording means. For simplification of the explanation, the RAID-1 (Redundant Arrays of Inexpensive Disks 1) is cited as an example above. However, it is also possible to apply the invention to a technique for managing plural hard disks collectively as one hard disk such as other RAIDs. In other words, it is possible to apply the invention to a technique for, to make it possible to restore data, giving redundancy, which is an amount indicating to which degree portions unnecessary as information are included, to data and recording the data.

In the embodiment, the AES is used as the local encryption. However, other means such as a DES (Data Encryption Standard), a Triple DES, and the like may be used. In the embodiment, data is locally encrypted using the key information peculiar to the apparatus and recorded in the plural recording means. However, the apparatus may set key information peculiar to each of the recording means.

It should be understood by those skilled in the art that various modifications, combinations, sub-combinations, and alterations may occur depending on design requirements and other factors insofar as they are within the scope of the appended claims or the equivalents thereof.

What is claimed is:

1. An encrypted data recording apparatus comprising:
a housing;
decrypting means within the housing for decrypting encrypted input data that is received via a secure data network transmission and temporarily storing the decrypted input data in an electronic memory;
encrypting means within the housing for encrypting the decrypted input data using key information that is exclusive to the encrypted data recording apparatus in order to provide locally encrypted data; and
recording control means for recording the locally encrypted data that is encrypted by the encrypting means in plural recording means located within the housing with redundancy given to the locally encrypted data, wherein the recording control means receives the locally encrypted data within the data recording apparatus and the locally encrypted data is stored without being transferred through the communication network, and further wherein the electronic memory and the plural recording means are located within the housing and the electronic memory and plural recording means are in electronic communication via a local data transfer bus that is within the housing.

2. An encrypted data recording apparatus according to claim 1, wherein the encrypting means automatically encrypts the decrypted input data, when it is determined that copying of the encrypted data is restricted.

3. An encrypted data recording apparatus according to claim 1, wherein the recording control means records the data by mirroring the data in the plural recording means.

4. An encrypted data recording apparatus according to claim 1, wherein an encryption system of a same standard is used for the decrypting means and the encrypting means.

5. An encrypted data recording apparatus according to claim 1, wherein the encrypted data is data subjected to AES encryption of a DTCP/IP standard.

6. An encrypted data recording apparatus comprising:
a housing;
a decrypting unit within the housing for decrypting encrypted input data that is received via a secure data network transmission and temporarily storing the decrypted input data in an electronic memory;
an encrypting unit within the housing for encrypting the data decrypted by the decrypting unit using key information that is exclusive to the encrypted data recording apparatus in order to provide locally encrypted data; and
a recording control unit recording the locally encrypted data that is encrypted by the encrypting unit in plural recording means located within the housing with redundancy given to the locally encrypted data, wherein the recording control means receives the locally encrypted data within the data recording apparatus and the locally encrypted data is stored without being transferred through the communication network, and further wherein the electronic memory and the plural recording means are located within the housing and the electronic memory and plural recording means are in electronic communication via a local data transfer bus that is within the housing.

* * * * *